(12) United States Patent
Murali et al.

(10) Patent No.: US 11,736,138 B2
(45) Date of Patent: Aug. 22, 2023

(54) DIGITAL UPCONVERTER FOR RADIO FREQUENCY SAMPLING TRANSMITTER

(71) Applicant: TEXAS INSTRUMENTS INCORPORATED, Dallas, TX (US)

(72) Inventors: Sriram Murali, Bengaluru (IN); Jaiganesh Balakrishnan, Bengaluru (IN); Pooja Sundar, Bengaluru (IN); Harshavardhan Adepu, Warangal (IN); Wenjing Lu, Shanghai (CN); Yeswanth Guntupalli, Guntur (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/493,943

(22) Filed: Oct. 5, 2021

(65) Prior Publication Data

US 2022/0029657 A1 Jan. 27, 2022

Related U.S. Application Data

(63) Continuation of application No. 17/072,104, filed on Oct. 16, 2020, now Pat. No. 11,171,681.

(30) Foreign Application Priority Data

Oct. 18, 2019 (IN) .............................. 201941042297

(51) Int. Cl.
*H04B 1/40* (2015.01)
*H04B 1/00* (2006.01)

(52) U.S. Cl.
CPC ............. *H04B 1/40* (2013.01); *H04B 1/0075* (2013.01)

(58) Field of Classification Search
CPC ............ H04B 2201/70703; H04B 1/69; H04B 1/707; H04B 7/0602; H04B 7/0854; H04B 10/1121; H04B 1/30; H04B 2201/70707; H04B 7/04; H04B 1/04; H04B 1/16; H04B 1/525; H04B 7/0617; H04B 7/08771
USPC .......................................................... 455/73
See application file for complete search history.

(56) References Cited

U.S. PATENT DOCUMENTS

2019/0238152 A1* 8/2019 Pagnanelli ............... H03M 3/51
2019/0386868 A1* 12/2019 Jiang ....................... H04L 27/20

* cited by examiner

*Primary Examiner* — Ajibola A Akinyemi
(74) *Attorney, Agent, or Firm* — Valerie M. Davis; Frank D. Cimino

(57) ABSTRACT

A digital up-converter (DUC) includes conjugate-mixer-combiner. The conjugate-mixer-combiner includes a pre-combiner configured to generate combinations of a first in-phase (I) value to be transmitted at a first frequency of a first frequency band, a first quadrature (Q) value to be transmitted at the first frequency of a first frequency band, a second I value for to be transmitted at a second frequency of a second frequency band, and a second Q value to be transmitted at the second frequency of a second frequency band. The conjugate-mixer-combiner further includes a plurality of multipliers collectively configured to shift the combinations based on an average difference between the first frequency and the second frequency.

20 Claims, 9 Drawing Sheets

DIGITAL UPCONVERTER FOR RADIO FREQUENCY SAMPLING TRANSMITTER

CROSS-REFERENCE TO RELATED APPLICATIONS

This continuation application claims priority to U.S. patent application Ser. No. 17/072,104, filed Oct. 16, 2020, which application claims priority to India Provisional Application No. 201941042297, filed Oct. 18, 2019, both of which are incorporated herein by reference in their entirety.

BACKGROUND

Some wireless systems (e.g., 5G Wireless Infrastructure (WI) systems) employ radio frequency (RF) sampling transceivers. RF sampling transceivers may have cost and power advantages for multi-band systems. In some examples, such RF transceivers include a digital up-converter (DUC) configured to convert complex signals received from a baseband processor at a lower frequency to an analog output at a higher frequency. The DUC includes separate interpolation chains for the multiple bands. Each interpolation chain is configured to take the corresponding band's complex baseband data at the baseband frequency to a higher combining sampling frequency (CSF). Complex mixers are used to separate the bands before the bands are added together to form a combined signal. A shared interpolation chain converts the combined signal to a digital-to-analog converter (DAC) sampling rate, and then, a complex-to-real mixer is used to translate the combined signal to an RF frequency. A DAC then generates an analog signal based on the combined signal.

One DUC metric in such a dual-stage mixing scheme is the maximum edge-to-edge band separation allowed for the two bands, referred to as the "combining bandwidth" (CBW) of the DUC. The combining bandwidth spans the frequency between the lowest frequency transmitted by either band to the highest frequency transmitted by either band. In some examples, the CBW is approximately 80% of the CSF rate of the complex mixers in the DUC. Accordingly, the CBW may be increased by utilizing complex mixers that have a higher CSF. Unfortunately, using complex mixers that have a higher CSF may result in an increased chip size of the DUC.

SUMMARY

In one example, a system includes a conjugate-mixer-combiner. The conjugate-mixer-combiner includes a pre-combiner configured to generate first and second combinations of: a first in-phase (I) value to be transmitted at a first frequency of a first frequency band; a first quadrature (Q) value to be transmitted at the first frequency of a first frequency band; a second I value for to be transmitted at a second frequency of a second frequency band; and a second Q value to be transmitted at the second frequency of a second frequency band. A first multiplier is coupled to the pre-combiner and is configured to shift the first combination based on an average difference between the first frequency and the second frequency. A second multiplier is coupled to the pre-combiner and is configured to shift the second combination based on an average difference between the first frequency and the second frequency.

BRIEF DESCRIPTION OF THE DRAWINGS

For a detailed description of various examples, reference will now be made to the accompanying drawings in which.

DETAILED DESCRIPTION

In one example, a DUC includes a conjugate-mixer-combiner (CMC). The CMC performs joint combining and complex mixing of two bands, by re-ordering the mixing and combining operations. The DUC includes a shared numerically-controlled oscillator (NCO) and a sine/cosine generator for both bands. The CMC frequency shifts the first band by a negative of an average difference between the first band and the second band and frequency shifts the second band by the average difference. While some complex mixers include four multiplication operations per band, the pre-combiner and conjugate mixer together utilizes four multiplication operations per complex output sample for both the bands together resulting in the area of the mixer and combiner being reduced by, for example, a factor of two. Alternately, for the same area, the sampling frequency and combining bandwidth may be double compared to implementations that have four multiplication operations per band.

Figure 1:
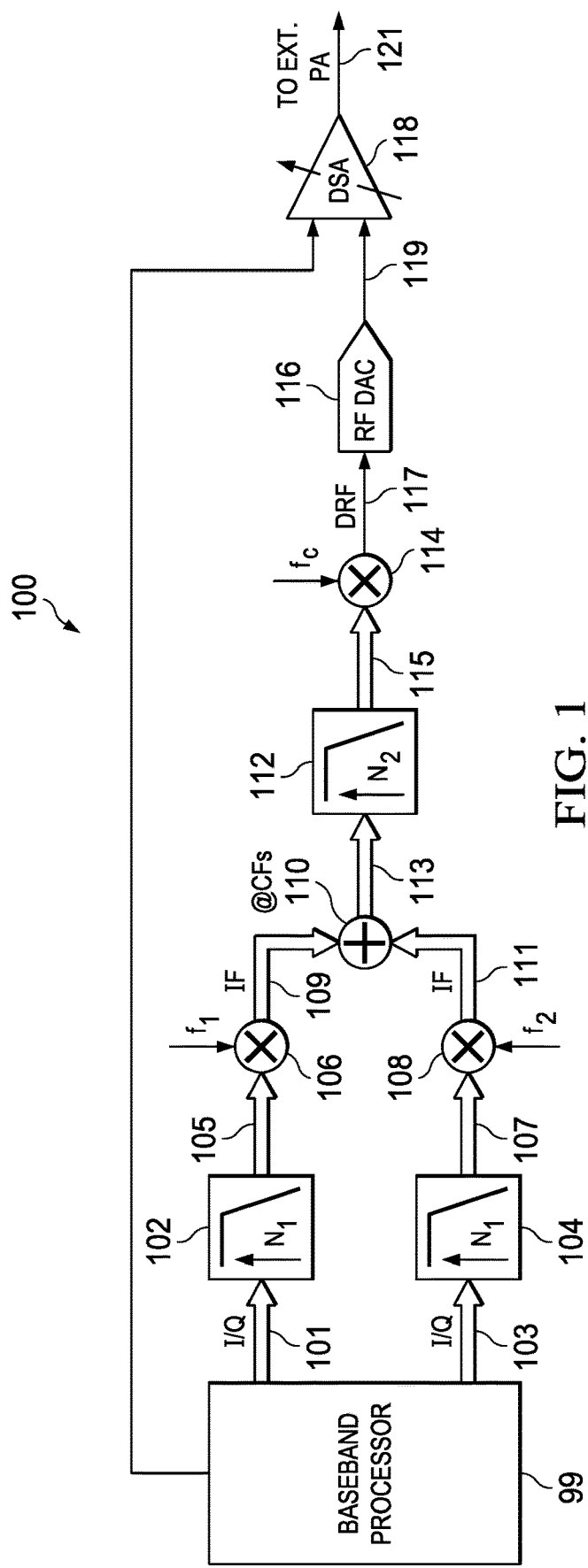
FIG. 1 illustrates an example of a digital up-converter (DUC).

FIG. 1 shows an example of a digital up-converter (DUC) 100. The example DUC 100 of FIG. 1 includes a first interpolator 102 and a second interpolator 104. The first interpolator 102 is configured to receive a first complex signal 101 (e.g., an I/Q signal) for a first frequency band from a baseband processor 99 (which may be provided as a separate chip from the DUC 100) and to interpolate the first complex signal 101 to a complex signal 105 at a higher sample rate (e.g., 1.5 giga samples per second (GSPS)). Similarly, the second interpolator 104 is configured to receive a second complex signal 103 for a second frequency band from the baseband processor 99 and to interpolate the second complex signal 103 to a complex signal 107 at a higher sample rate (e.g., 1.5 GSPS). The first interpolator 102 is connected to a first complex mixer 106 which receives the complex signal 105 and translates the complex signal 105 to an intermediate frequency (IF) signal 109 at a first frequency ($f_1$). The second interpolator 104 is connected to a second complex mixer 108 which receives the complex signal 107 and translates the complex signal 107 to an IF signal 111 at a second frequency ($f_2$). The complex mixers 106, 108 are connected to an adder 110 which combines the complex IF signals 109 and 111 at a combining sample rate (CSF) (e.g., 1.5 GSPS) to generate a combined signal 113. The combined signal 113 is a complex signal.

The adder 110 is connected to a third interpolator 112 which receives the combined signal 113 and interpolates the combined signal 113 to a signal 115 at an even higher sample rate (e.g., 12 GSPS) than that of the combined signal 113. The third interpolator 112 is connected to a complex-to-real mixer 114 which converts the signal 115 to a digital radio frequency (DRF) signal 117. The DRF signal 117 generated by the complex-to-real mixer 114 is a real signal (e.g., the values of the signal 117 generated by the complex-to-real mixer 114 are real numbers).

The complex-to-real mixer 114 is connected to an RF digital-to-analog converter (RF DAC) 116 which converts DRF signal 117 output by the complex-to-real mixer 114 to an analog signal 119. The RF DAC 116 is connected to a digital step attenuator (DSA) 118 which receives the analog signal 119 from the RF DAC 116 and adjusts the amplitude of the analog signal 119 to produce an output signal 121 to provide to another component such as a power amplifier (PA). The gain level applied by the DSA 118 is controlled by, for example, the baseband controller 99.

Figure 2:
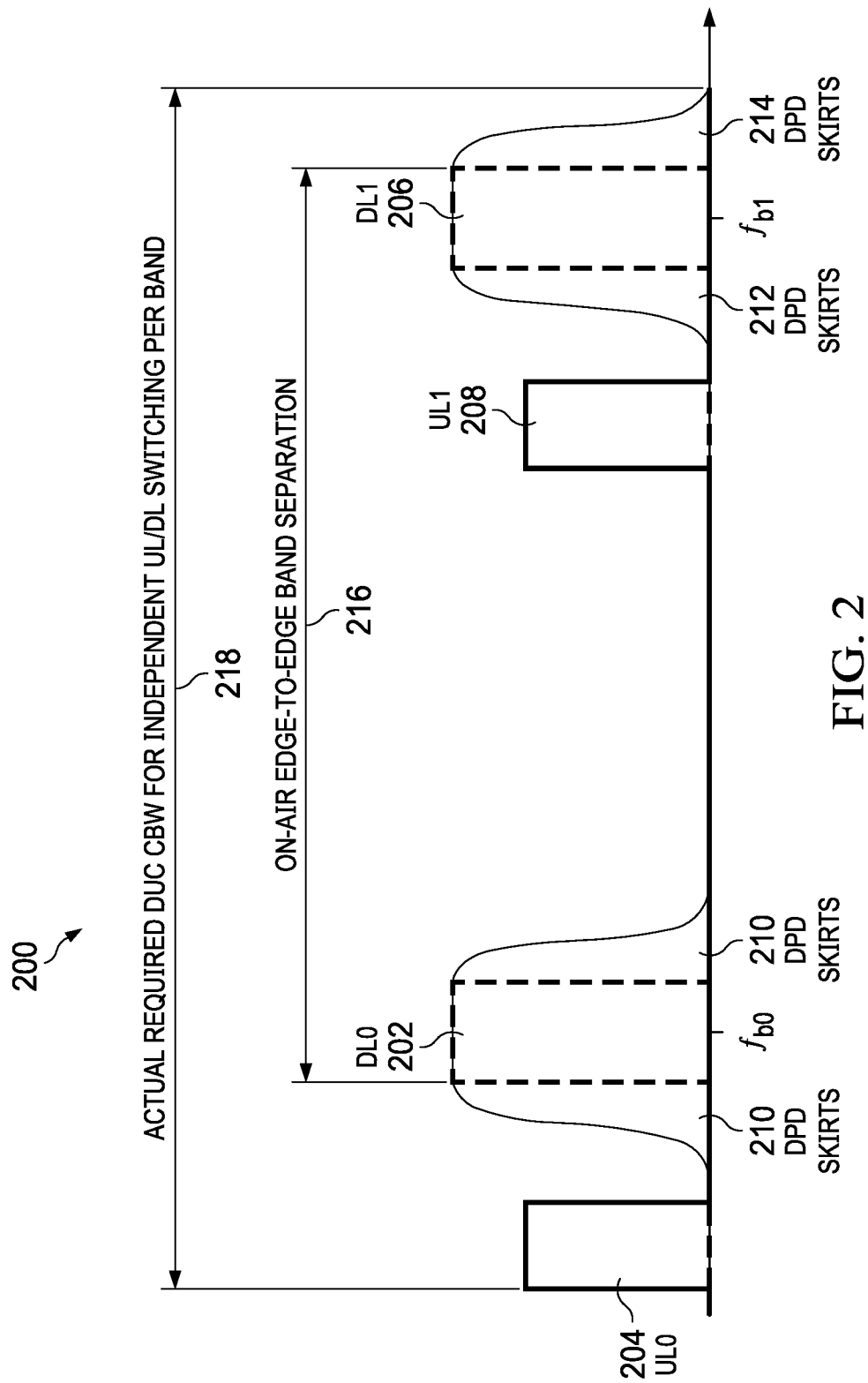
FIG. 2 is a diagram illustrating combining bandwidth.

A maximum frequency separation (combining bandwidth, CBW) between the frequency bands to which the DUC 100 outputs data is based on the CSF of the complex mixers 106, 108. FIG. 2 is a diagram 200 illustrating the combining bandwidth for a frequency division duplex (FDD) system, although the principles described herein are applicable to time division duplex (TDD) systems as well. FIG. 2 depicts a first downlink band 202 and a first uplink band 204 of first frequency band. FIG. 2 further depicts a second downlink band 206 and a second uplink band 208 of a second frequency band. The uplink bands (UL0 204 and UL1 208) are at lower frequencies than their corresponding downlink bands 202 and 206 in this example, but can be at frequencies higher than their corresponding downlink bands in other examples. Some DUC devices introduce digital predistortion into signals transmitted on the downlink bands. In the illustrated example, reference numerals 210 and 212 identify digital predistortion (DPD) skirts which result from bandwidth expansion due to the nonlinear operations performed during digital predistortion. FIG. 2 further depicts an on-air band separation 216 and a combining bandwidth 218 between the first band and the second band. In this FDD example, the combining bandwidth 218 is the frequency separation between the lower frequency limit of the first uplink band 204 and the higher limit of the digital predistortion 214. In order to increase the combining bandwidth 218 illustrated in FIG. 2 using a system arranged similarly to the DUC 100 of FIG. 1, the CSF of the complex mixers 106, 108 and the adder 110 may be increased. However, this may lead to an increase in area and power consumption of the DUC 100, which may be undesirable in components in which size and power consumption are considerations (e.g., cellular base stations).

Figure 3:
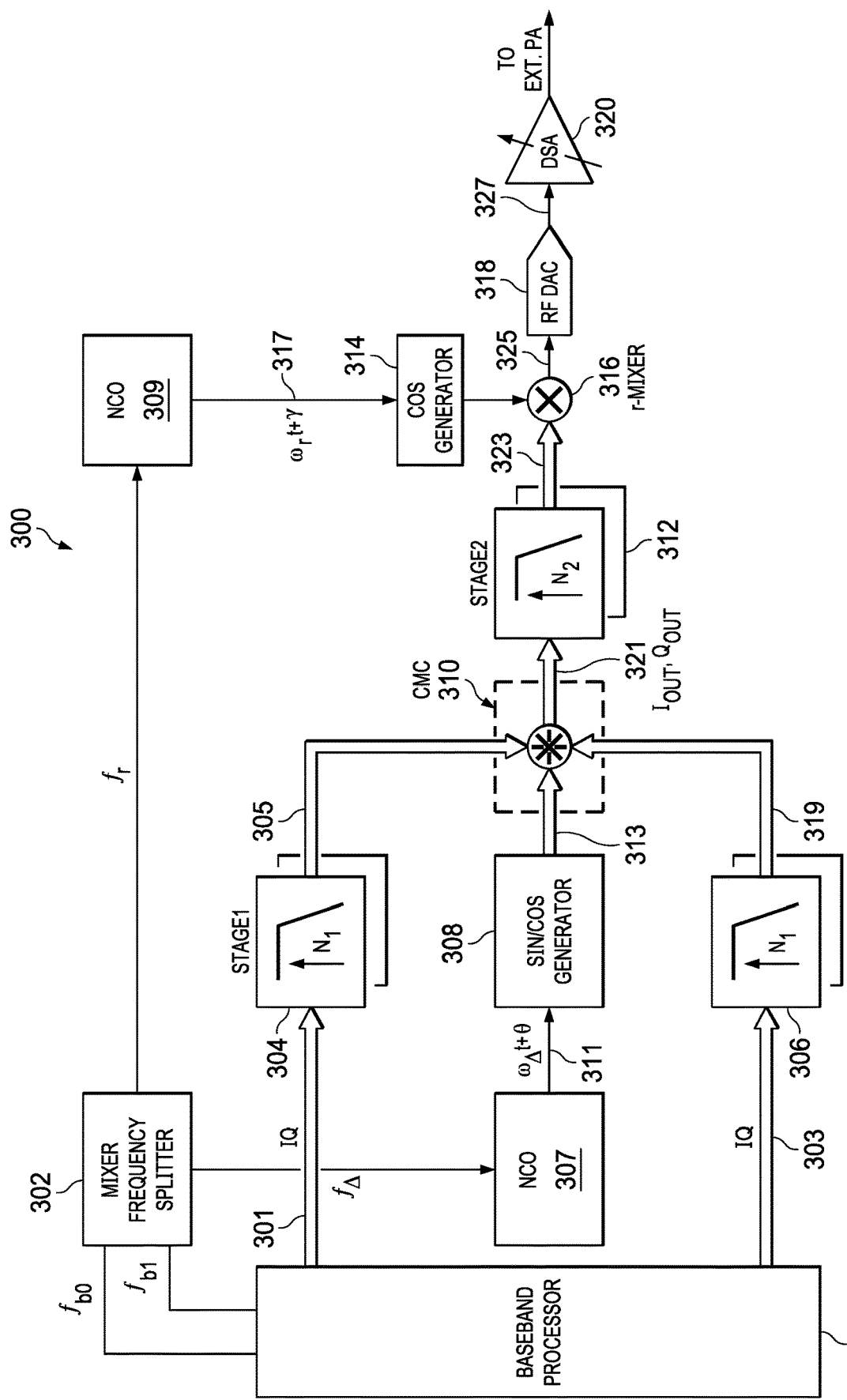
FIG. 3 is a diagram illustrating a DUC that includes a conjugate-mixer-combiner (CMC).

FIG. 3 illustrates an example of a DUC 300 that includes a conjugate-mixer-combiner 310. The DUC 300 also includes a mixer frequency splitter 302. The mixer frequency splitter 302 is configured to receive a value indicative of a first frequency $f_{b0}$ and a value indicative of a second frequency $f_{b1}$. In one example, the values of $f_{b0}$ and $f_{b1}$ are provided by the baseband processor 99. In another example, the baseband processor 99 programs one or more registers with the values of $f_{b0}$ and $f_{b1}$ and the register provides(s) those values to the mixer frequency splitter 302. The values of $f_{b0}$ and $f_{b1}$ are values indicative of certain frequencies. The first frequency $f_{b0}$ is a frequency at which a first frequency band is to be centered and the second frequency $f_{b1}$ is a frequency at which a second frequency band is to be centered. The mixer frequency splitter 302 includes hardware and/or software configured to output a value indicative of a frequency midpoint $$f_r = \frac{f_{b0} + f_{b1}}{2}$$

(e.g., a value half-way between $f_{b0}$ and $f_{b1}$) and an average difference value $$f_\Delta = \frac{f_{b1} - f_{b0}}{2},$$

that is, one-half of the difference in frequency between $f_{b0}$ and $f_{b1}$). Accordingly, $f_{b0}=-f_\Delta+f_r$ and $f_{b1}=f_\Delta+f_r$, where $f_\Delta$ is the difference between $f_{b0}$ and $f_{b1}$.

The example DUC 300 of FIG. 3 further includes a first numerically controlled oscillator (NCO) 307 (e.g., an accumulator) connected to an output of the mixer frequency splitter 302. NCO 307 receives the average difference $f_\Delta$. The first NCO 307 generates a value 311 indicative of $\omega_\Delta t+\theta$ which is an instantaneous phase corresponding to $f_\Delta$. In a discrete-time system (such as the DUC 300), the DUC generates a sequence of samples of a continuous-time phase (at the relevant sampling rate). Based on a representation of a target frequency, the NCO 307 generates (in the form of, typically, a Frequency Control Word, or FCW), a sequence of values corresponding to the time-samples of the desired phase of the sine/cosine to be generated. Also, the fact that phase values are "circular" is exploited by the NCO 307: the wrapped phase (a value between 0 and $2\pi$ radians) is what is needed at any instant, so the instantaneous phase is allowed to wrap around to the 0 to $2\pi$ range whenever it crosses $2\pi$ radians. Further, the NCO 307 may use finite precision presentation. For example a 32-bit NCO, which is such that a value of $2^{32}$ maps to $2\pi$ radians, may be implemented, for example, as a 32-bit accumulator that increments (every clock) by an amount equal to the phase change in one sample time internal.

The DUC 300 further includes a sine/cosine (sin/cos) generator 308 connected to an output of the first NCO 307. The sin/cos generator 308 is configured to receive the value 311 indicative of $\omega_\Delta t+\theta$. The sin/cos generator 308 is connected to the conjugate-mixer-combiner 310. The sin/cos generator 308 generates a sine wave signal and a cosine wave signal (collectively identified by reference numeral 313) based on the average difference $f_\Delta$ (e.g., based on $\omega_\Delta t+\delta$) provided to the conjugate-mixer-combiner 310 as further described below.

The DUC 300 further includes a first interpolator 304 configured to receive a first complex signal 301 (e.g., in in-phase/quadrature (I/Q)) from a baseband processor. I/Q 301 includes components $I_0$ and $Q_0$. The first complex signal 301 includes data to be output over the first band centered at $f_{b0}$. The first interpolator 304 interpolates the first complex signal to produce an output complex signal 305 at a higher sample rate (e.g., 1.5 Gsps) and to output the output complex signal 305 at the higher sample rate to the conjugate-mixer-combiner 310.

The DUC 300 further includes a second interpolator 306 which receives a second complex signal 303 (e.g., in I/Q) from the baseband processor. I/Q 303 includes components $I_1$ and $Q_1$. The second complex signal 303 includes data to be output over the second band centered at $f_{b1}$. The second interpolator 306 interpolates the second complex signal 303 to produce an output complex signal 319 at a higher sample rate (e.g., 1.5 Gsps) and to output the output complex signal 319 at the higher sample rate to the conjugate-mixer-combiner 310.

The benefit of the architecture of FIG. 3 results from the mixing and combining using the CMC 310. A complex mixer, such as complex mixer 106 in FIG. 1, generally includes four real multipliers (in this case, to compute the $I_0*Cos(\bullet)$, $I_0*Sin(\bullet)$, $Q_0*Cos(\bullet)$, and $Q_0*Sin(\bullet)$ values) and some adders to generate the I and Q values at the output. The use of four real multipliers is possible if the constituent hardware (digital mixers, adders, etc.) can be synthesized to run at the desired sampling rate. However, this is not always possible. For instance, the desired sampling rate might be 1.5 GSPS, but it might only be possible to synthesize hardware to run at half that speed (750 MHz), in a given silicon technology node. In such a scenario, the computations at higher sampling rates are parallelized. In this example, two input complex samples are processed in each 750 MHz clock cycle to produce two output complex samples. Consequently, approximately double the hardware and thus double the number of multipliers would be needed. Accordingly, for the two bands together, in FIG. 1, assuming a CSF of 1.5 GSPS but digital synthesis frequency of 750 MHz, the complex mixer 106 would need 4*2*2=16 real multipliers to be present.

In contrast, the CMC 310 of FIG. 3 needs only four real multiplication operations for the two bands together. For a CSF of 1.5 GSPS (and implementing parallelization as explained above), 4*2=8 real multipliers in total are needed, not 16 as explained above. Alternatively stated, for 16 real multipliers, CMC 310 can operate at twice the CSF (e.g., 3 GSPS) compared to the complex mixers of FIG. 1. As such, compared to the architecture of FIG. 1, the CMC 310 of FIG. 3 needs fewer real multipliers, and thus for a given number of multipliers in hardware, can effectively run at a higher parallelization, and hence higher CSF. Because the instantaneous phases provided to the frequency bands by the CMC 310 are negatives of each other, any per-band phase corrections (such as DSA phase error correction), or frequency switch, is performed, as is explained below, by exploiting the availability of a shared complex-to-real mixer in the DUC.

Figure 4:
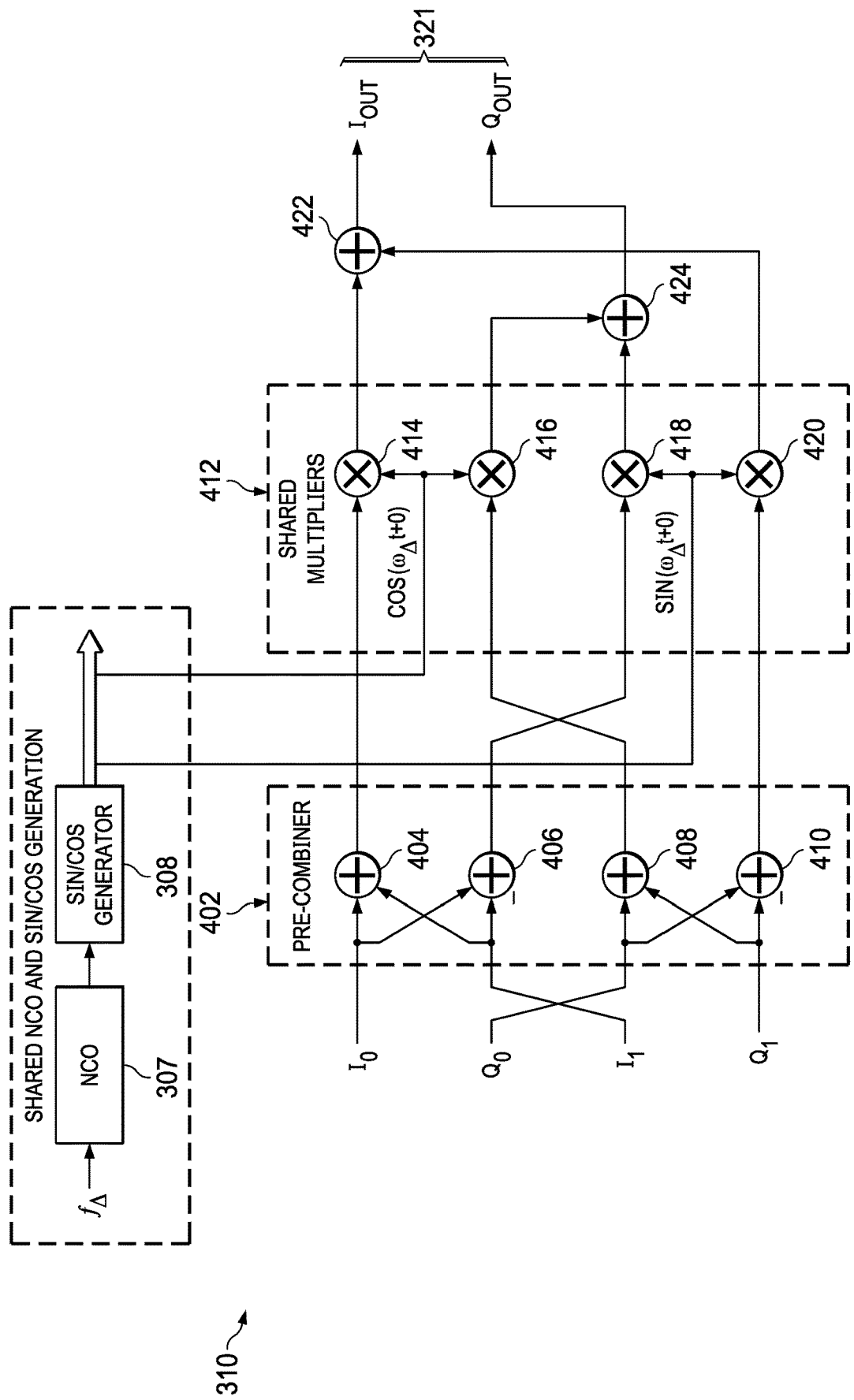
FIG. 4 is a diagram illustrating details of the CMC.

FIG. 4 shows an example implementation of the conjugate-mixer-combiner 310. As shown, the conjugate-mixer-combiner 310 includes a pre-combiner 402, which in this example, includes four adders 404, 406, 408, and 410. Adder 404 adds together $I_0$ and $I_1$, where, as noted above, $I_0$ is the in-phase (I) value of complex signal 301 to be output on the first band centered at $f_{b0}$, and $I_1$ is the in-phase value of complex signal 303 to be output on the second band centered at $f_{b1}$. Adder 406 adds together $I_0$ and $-I_1$. Adder 408 adds together $Q_0$ and $Q_1$, where, as noted above, $Q_0$ is the quadrature (Q) value of complex signal 301 to be output on the first band centered at $f_{b0}$, and $Q_1$ is the Q value of the complex signal 303 to be output on the second band centered at $f_{b1}$. Adder is configured to sum $Q_0$ and $-Q_1$.

The conjugate-mixer-combiner 310 further includes shared multipliers 412 and adders 422 and 424 that process the I and Q values for both frequency bands $f_{b0}$ and $f_{b1}$. The multipliers 412 shift the combinations of the I and Q components of the frequency bands from the pe-combiner 402. Multiplier 414 receives $\cos(\omega_A t+\theta)$ from the sin/cos generator 308 and frequency shifts an output of adder 404 $(I_0+I_1)$ based on $\cos(\omega_A t+\theta)$. Multiplier 416 receives cos $(\omega_A t+\theta)$ from the sin/cos generator 308 and frequency shifts an output of adder 408 $(Q_0+Q_1)$ based on $\cos(\omega_A t+\theta)$. Multiplier 418 receives $\sin(\omega_A t+\theta)$ from the sin/cos generator 308 and frequency shifts an output of adder 406 $(-I_0+I_1)$ based on $\sin(\omega_A t+\theta)$. Multiplier 420 receives $\sin(\omega_A t+\theta)$ from the sin/cos generator 308 and frequency shifts an output of adder 410 $(-Q_1+Q_0)$ based on $\sin(\omega_A t+\theta)$.

Adder 422 generates a combined I value, $I_{out}$, by summing the results of multiplier 414 and multiplier 420. Adder 424 generates a combined Q value, $Q_{out}$, by summing results of multiplier 416 and multiplier 418. The structure of conjugate-mixer-combiner 310 results in a shift of $-f_A$ for $I_0$ and $Q_0$ and a shift of $f_A$ for $I_1$ and $Q_1$ in $I_{out}$ and $Q_{out}$ (collectively, $I_{out}$ and $Q_{out}$ 321). Because the I, Q values ($I_0$, $Q_0$, $I_1$, $Q_1$) are preprocessed into combined effective values by the pre-combiner 402 before being multiplied, the conjugate-mixer-combiner 310 includes fewer multipliers (e.g., half as many) compared to a mixer that separately processes the first band and the second band. As explained above, the conjugate-mixer-combiner 310 may operate at a faster sample rate as compared to an equivalently-sized complex mixer.

Referring back to FIG. 3, interpolator 312 receives the combined signal values $I_{out}$ and $Q_{out}$ 321 and interpolates the combined signal values to signal values 323 at a higher sample rate. Interpolator 312 outputs the interpolated combined signal values 323 to a real mixer 316. The DUC 300 further includes a second NCO 309 connected to the mixer frequency splitter 302. NCO 309 receives the midpoint $f_r$ value from the mixer frequency splitter 302. The second NCO 309 generates a value 317 indicative of $\omega_r t+\gamma$, a phase sequence corresponding to $f_r$. The DUC 300 further includes a cos generator 314 connected to an output of the second NCO 309. The cos generator 314 receives $\omega_r t+\gamma$ from NCO 309. The output of the cos generator 314 is connected to an input of the real mixer 316. Cos generator 314 outputs a cosine wave based on the midpoint $f_r$ (e.g., based on value 317 indicative of $\omega_r t+\gamma$) to the real mixer 316. The real mixer 316 frequency shifts the complex combined signal output by interpolator 312 based on $\cos(\omega_r t+\gamma)$ and generates a real (i.e., no imaginary signal component) RF signal 325 (e.g., to convert the complex $I_{out}$ and $Q_{out}$ values to real values). This results in an RF signal with frequency bands centered around $f_r$. The architecture of FIG. 3 further includes an RF DAC 318 which receives the RF signal 325 output by the real mixer 316 and converts the RF signal 325 to an analog signal 327. A DSA 320 also is included which receives the analog signal 327 from the RF DAC 318 and to adjust a gain of the analog signal based on feedback from a broadband processor. In one example, the RF DAC 318 and DSA 320 may be provided on a separate chip as DUC 300, but can be implemented on the same chip in another example.

Because the DUC 300 of FIG. 3 incorporates the conjugate-mixer-combiner 310 which includes fewer multipliers (e.g., 50 percent less) compared to a DUC with a complex mixer for each frequency band, the mixing and combining of the two frequency bands can be performed at a higher sampling compared to a similarly-sized DUC that incorporates a complex mixer per frequency band. Accordingly, the DUC 300 may provide a greater multiplying bandwidth as compared to a similarly sized DUC.

A DSA may have a number of attenuation steps, e.g., a range of 0 through 39 dB range, in steps of 1 dB—resulting in 40 steps in this example. The DSA controls the gain on the signal provided to a power amplifier to compensate for gain variations in the power amplifier across time and temperature so that the power amplifier output power is held steady. However, some DSAs may introduce a phase change on the signal at each attenuation step (with respect to the 0-dB setting). In general, this phase error may be frequency dependent. To a first order approximation, the phase variation within the signal bandwidth for a given frequency band might be small, but across the two bands, the differences could be substantial. DSA 320 of the disclosed examples corrects for phase error as a function of DSA attenuation setting. Further, DSA 320 implements the phase correction separately for the two bands in a dual band DUC.

Figure 5:
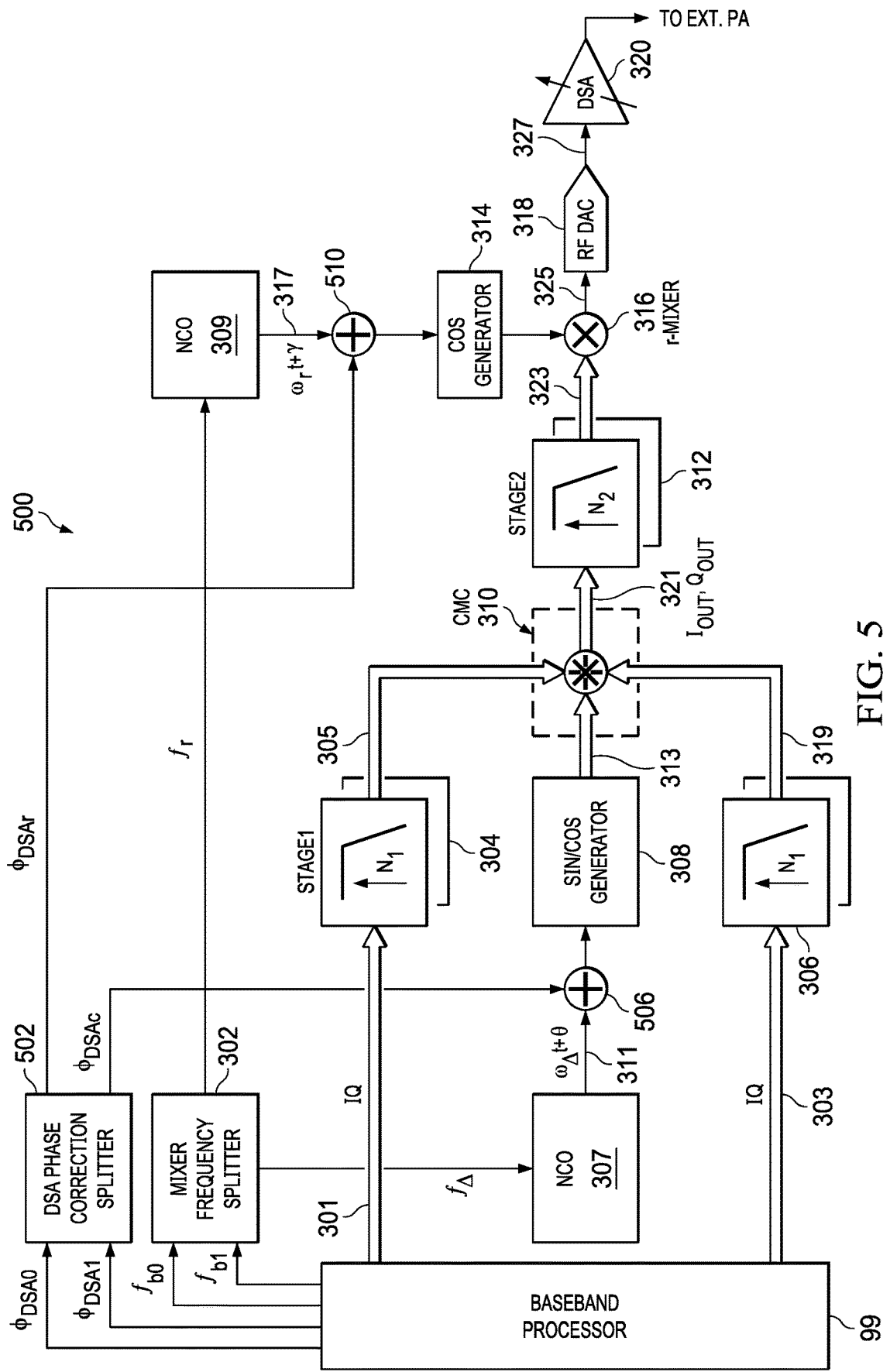
FIG. 5 is a diagram illustrating a DUC that includes the CMC and provides DSA phase correction.

FIG. 5 illustrates an example of a DUC 500 that incorporates the conjugate-mixer-combiner 310 and provides independent, per-band DSA phase correction. The DUC 500 includes the components of the DUC 300 and several additional components. For example, the DUC 500 includes a DSA phase correction splitter 502 and an adder 506. The DSA phase correction splitter 502 includes software, hardware, or a combination thereof. From the baseband processor 99, the DSA phase correction splitter 502 receives a first DSA phase correction value, $\phi_{DSA0}$, for the first band centered at $f_{b0}$, and a second DSA phase correction value, $\phi_{DSA1}$, for the second band centered at $f_{b1}$ and calculates and outputs an average difference $$\phi_{DSAc} = \frac{\phi_{DSA0} - \phi_{DSA1}}{2}$$

and an average $$\phi_{DSAr} = \frac{\phi_{DSA0} + \phi_{DSA1}}{2}$$

of the first and second DSA phase corrections. Accordingly, in one example, the DSA phase correction splitter 502 calculates $\phi_{DSA0}$ as $-\phi_{DSAc}+\phi_{DSAr}$ and $\phi_{DSA1}$ as $\phi_{DSAc}+\phi_{DSAr}$. The DSA phase correction values, for example, may be pre-stored in a look-up table as a result of a factory calibration process. The DSA phase correction splitter applies phase correction for each band separately.

Adder 506 is arranged between the first NCO 307 and the sin/cos generator 308 and is configured to receive $\phi_{DSAc}$ from the DSA phase correction splitter 502 and the value 311 indicative of $\omega_\Delta t+\theta$ from NCO 307. Adder 506 computes and outputs a sum of $\phi_{DSAc}$ and $\omega_\Delta t+\theta$ to the sin/cos generator 308 such that the sin/cos generator 308 outputs $\sin(\omega_\Delta t+\theta+\phi_{DSAc})$ and $\cos(\omega_\Delta t+\theta+\phi_{DSAc})$ to the conjugate-mixer-combiner 310 rather than $\sin(\omega_\Delta t+\theta)$ and $\cos(\omega_\Delta t+\theta)$ as in the DUC 300 of FIG. 3.

An adder 510 is arranged between the NCO 309 and the cos generator 314 and is configured to receive $\phi_{DSAr}$ from the DSA phase correction splitter 502 and the value 317 indicative of $\omega_r t+\gamma$ from the NCO 309. Adder 510 computes and outputs a sum of $\phi_{DSAr}$ and $\omega_r t+\gamma$ to the cos generator 314 such that the cos generator 314 outputs $\cos(\omega_r t+\gamma+\phi_{DSAr})$ to the conjugate-mixer-combiner 310 rather than $\cos(\omega_r t+\gamma)$ as in the DUC 300. Accordingly, the output of the real mixer 316 is phase corrected such that the first band is corrected by $\phi_{DSA0}$ and the second band is corrected by $\phi_{DSA1}$. Thus, the sin/cos generator 308 and the cos generator 314 jointly apply phase correction to the first and second frequency.

Figure 6:
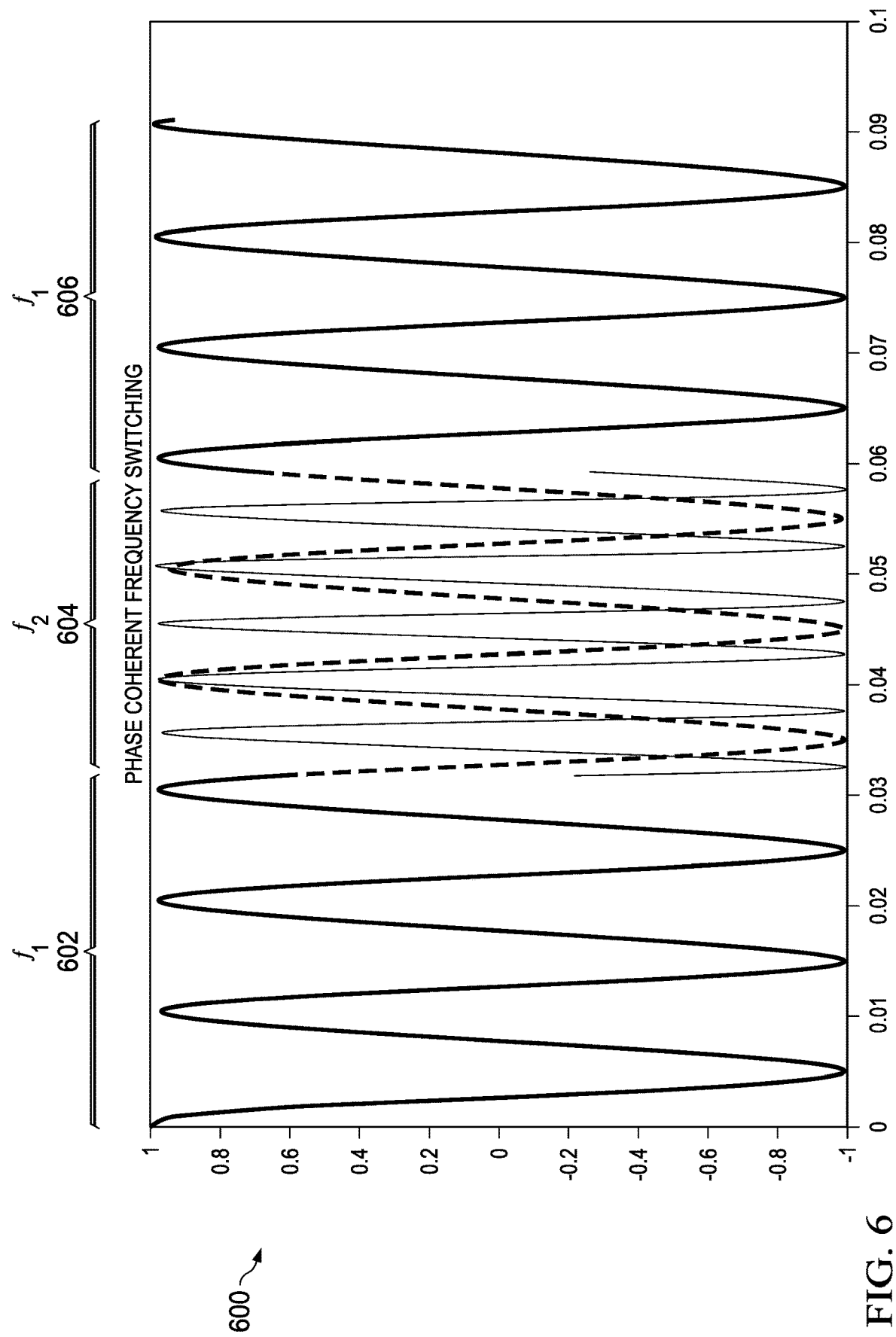
FIG. 6 is a diagram illustrating coherent phase switching.

In some applications (e.g., for calibration processes), a transmitter may switch between transmitting on a first frequency (e.g., downlink) within a band to transmitting within a second frequency (e.g., uplink) within the band. In one example, a baseband processor may transmit data in the downlink bands. However, at times, the baseband processor may switch to the uplink band to send a signal, not for transmission to a receiving device, but to loop-back to one of the receiver channels (using, for example, on-board signal re-routing circuitry), to calibrate various aspects of the transmit and/or the receiver signal chain by making use of the known transmit signal. FIG. 6 illustrates a waveform 600 output by a transmitter that switches between frequencies. A first portion 602 of the waveform is transmitted at a first frequency ($f_1$), a second portion 604 is transmitted at a second frequency ($f_2$), and a third portion 606 of the waveform is transmitted at the first frequency $f_1$. In the illustrated example, the transmitter switches between frequencies in a phase coherent fashion. That is, and as indicated by the dashed line continuation of the first portion 620, the phase of the first portion 602 and of the third portion 606 align as if the second portion 604 was a continuation of the first portion. Phase coherent frequency switching in a DUC is advantageous because channel phase estimates can remain valid. Another desirable attribute may be phase continuity. Phase continuity refers to a non-switching band maintaining a consistent phase during a period in which another band switches frequencies.

Figure 7:
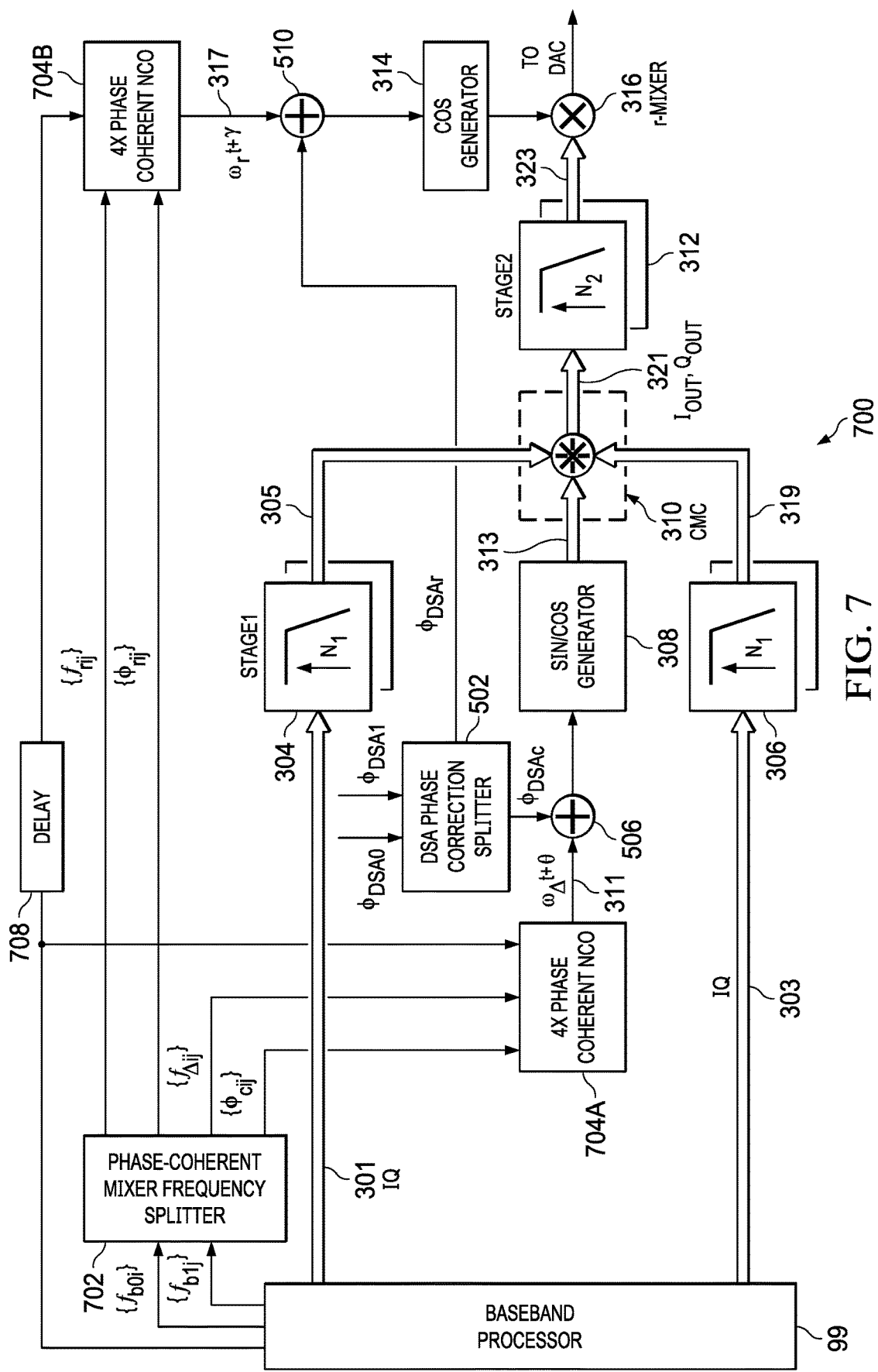
FIG. 7 is a diagram of a DUC that includes the CMC and provides coherent phase switching.

FIG. 7 is a diagram of an example DUC 700 that includes the conjugate-mixer-combiner 310 and provides phase coherent switching with phase continuity. The DUC 700 includes some of the components of the DUC 500. One difference between DUC 700 and DUC 500 is that DUC 700 includes a phase-coherent mixer frequency splitter 702 in place of the mixer frequency splitter 302, a first phase coherent NCO group 704A in place of the first NCO 307, and a second phase coherent NCO group 704B in place of the second NCO 309. While not illustrated in FIG. 7, the DUC 700 includes the RF DAC 318 coupled to the output of the real mixer 316 and the DSA 320 coupled to the RF DAC 318. The DUC 700 further includes a delay unit 708.

The phase-coherent mixer frequency splitter 702 is configured to receive frequencies, $f_{b0i}$ (e.g., $f_{b01}$ and $f_{b02}$), for a first frequency band $f_{b0}$ and frequencies, $f_{b1j}$ (e.g., $f_{b10}$ and $f_{b11}$), for a second frequency band $f_{b1}$. The phase-coherent mixer frequency splitter 702 includes hardware and/or software configured to output a midpoint $$f_{rij} = \frac{f_{b0i} + f_{b1j}}{2}$$

and an average difference $$f_{\Delta ij} = \frac{f_{b1j} - f_{b0i}}{2}$$

for each pair of $f_{b0i}$ and $f_{b1j}$. For example, the phase-coherent mixer frequency splitter 702 may output $f_{r00}$, $f_{r01}$, $f_{r10}$, and $f_{r01}$ and $f_{\Delta 00}$, $f_{\Delta 01}$, $f_{\Delta 10}$, and $f_{\Delta 01}$ Accordingly, $f_{b0i}=-f_{\Delta ij}+f_{rij}$ and $f_{b1j}=f_{\Delta ij}+f_{rij}$.

The phase-coherent mixer frequency splitter 702 is configured to output complex mixer phase offset, $\phi_{cij}$, and real mixer phase offset, $\phi_{rij}$, for each pair of $f_{b0i}$ and $f_{b1j}$. The complex mixer phase offsets are set so that a mixer phase offset of $f_{b0}$ for a given i, j is $\theta_{b0ij}=-\phi_{cij}+\phi_{rij}$ and a mixer phase offset of $f_{b1}$ is $\theta_{b1ij}=\phi_{cij}+\phi_{rij}$.

Figure 8:
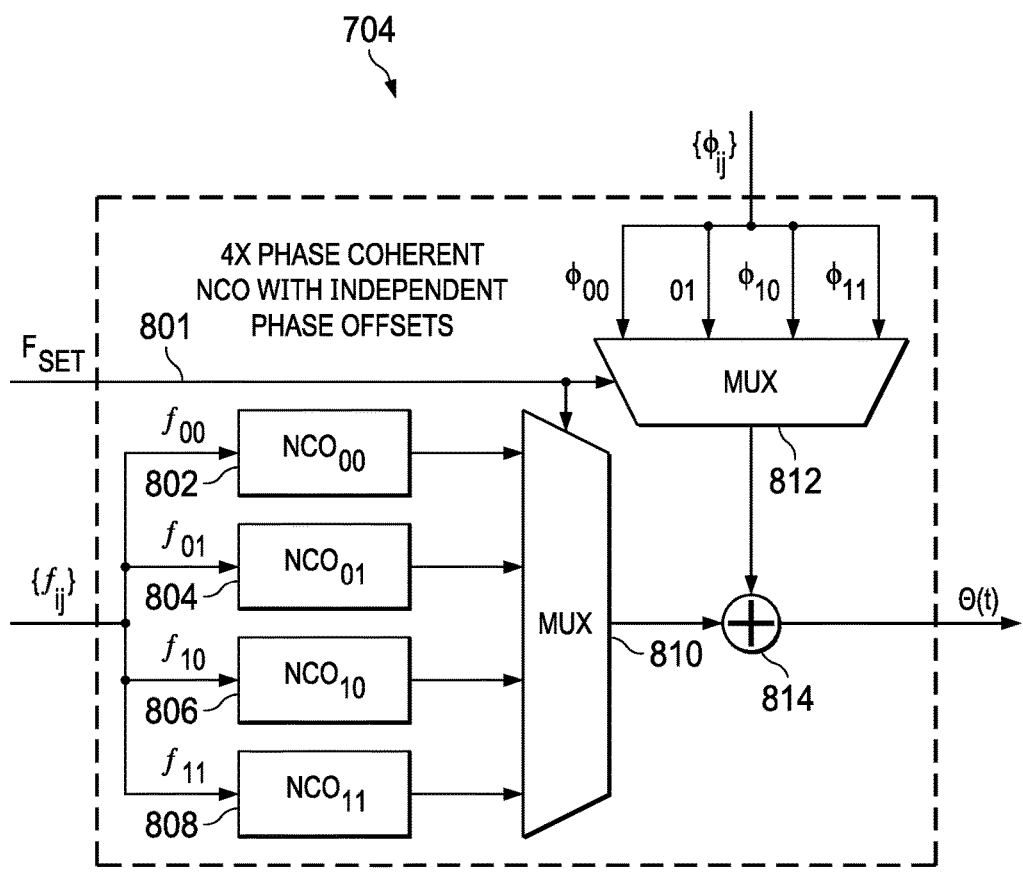
FIG. 8 is a diagram illustrating an example of a numerically controlled oscillator group that may be included in a DUC that provides coherent phase switching.

The first NCO group 704A (an example of which is illustrated in FIG. 8) is configured to receive the complex mixer phase offsets $\phi_{cij}$ and the average differences $f_{\Delta ij}$ from the phase-coherent mixer frequency splitter 702. The first NCO group 704A is further configured to receive a selection signal (e.g., from a baseband processor) indicating a selected first band frequency ($f_{b0i}$) and a selected second band frequency ($f_{b1j}$). The second NCO group 704B is configured to receive the real mixer phase offsets $\phi_{rij}$ and the midpoints $f_{rij}$ from the phase-coherent mixer frequency splitter 702. The second NCO group 704B is further configured to receive the selection signal indicating a selected first band frequency ($f_{b0i}$) and a selected second band frequency ($f_{b1j}$). The delay unit 708 is configured to introduce a delay in the selection signal.

FIG. 8 is an example implementation of an NCO group 704, such as the first NCO group 704A or the second NCO group 704B. The example NCO group 704 includes a first NCO 802 configured to receive a frequency value associated with transmitting at the first frequency within the first frequency band and the first frequency within the second frequency (e.g., $f_{00}$). In the case of the first NCO group 704A, the first NCO 802 receives $f_{\Delta 00}$. In the case of the second NCO group 704B, the first NCO 802 receives $f_{r00}$. The example NCO group 704 includes a second NCO 804 configured to receive a frequency value associated with transmitting at the first frequency within the first frequency band and the second frequency within the second frequency (e.g., $f_{01}$). In the case of the first NCO group 704A, the second NCO 804 receives $f_{\Delta 01}$. In the case of the second NCO group 704B, the second NCO 804 receives $f_{r01}$. The example NCO group 704 includes a third NCO 806 configured to receive a frequency value associated with transmitting at the second frequency within the first frequency band and the first frequency within the second frequency (e.g., $f_{10}$). In the case of the first NCO group 704A, the third NCO 806 receives $f_{\Delta 10}$. In the case of the second NCO group 704B, the third NCO 806 receives $f_{r10}$. The example NCO group 704 includes a fourth NCO 808 configured to receive a frequency value associated with transmitting at the second frequency within the first frequency band and the second frequency within the second frequency (e.g., $f_{11}$). In the case of the first NCO group 704A, the fourth NCO 808 receives $f_{\Delta 11}$. In the case of the second NCO group 704B, the fourth NCO 808 receives $f_{r11}$. Each NCO 802-808 (which may be implemented as an accumulator) is configured to output a synchronous, discrete-time, discrete valued representation of the phase corresponding to a frequency value received at the NCO to a first multiplexor 810. The first multiplexor 810 is configured to pass the output of the NCO 802-808 that is associated with a selected pair of frequencies to a phase offset adder 814 based on a selection signal 801 from the baseband processor 99.

The example NCO group 704 further includes a second multiplexor 812. The second multiplexor 812 is configured to receive a phase offset values $\phi_{ij}$ from the phase-coherent mixer frequency splitter 702. In the case of the first NCO group 704A, the phase offset values received at the second multiplexor 812 are the complex mixer phase offset values $\phi_{cij}$. In the case of the second NCO group 704B, the phase offset values received at the second multiplexor 812 are the real mixer phase offset values $\phi_{rij}$. The second multiplexor 812 is configured to pass the phase offset value that is associated with a selected pair of frequencies to the phase offset adder 814 based on the selection signal 801 from the baseband processor 99. The phase offset adder 814 generates a sum of the selected phase offset value from multiplexor 812 and the phase sequence corresponding to the frequency value from multiplexor 810.

Referring back to FIG. 7, adder 506 adds the output of the first NCO group 704A (which is a sum of the phase sequence corresponding to an average frequency difference and a complex mixer phase offset selected based on a selected pair of frequencies) and the average DSA phase correction, $\phi_{DSAc}$. The adder 506 passes the result to the sin/cos generator 308 for use in the conjugate-mixer-combiner 310, as described above.

Similarly, adder 510 adds the output of the second NCO group 704B (which is a sum of the phase sequence corresponding to a frequency midpoint and a real mixer phase offset selected based on a selected pair of frequencies) and the average DSA phase correction, $\phi_{DSAr}$, and pass a result to the cos generator 314 for use in the real mixer 316, as described above. The delay introduced by the delay unit 708 may compensate for time spent by the interpolator 312 to generate its output.

Accordingly, the first NCO group 704A and the second NCO group 704B provide for coherent switching of frequencies within a band. Further, the phase offsets introduced by the NCO groups 704A, 704B provide for phase continuity in a band that does not switch frequencies while another switches frequencies. Further, the delay unit 708 may improve phase continuity by aligning output of the third interpolator 312 and the cos generator 314. In one implementation, the amount of delay implemented by the delay unit 708 is configurable based on, for example, the choice interpolation factor, filter latency, etc. Thus, FIG. 7 illustrates an example of a DUC 700 that may provide increased multiplying bandwidth, phase coherent switching, and DSA phase correction. The phase coherent switching ability operates independently on each frequency band without disturbing the non-switching band. Similarly, the DSA phase correction is applicable independently on each band.

Figure 9:
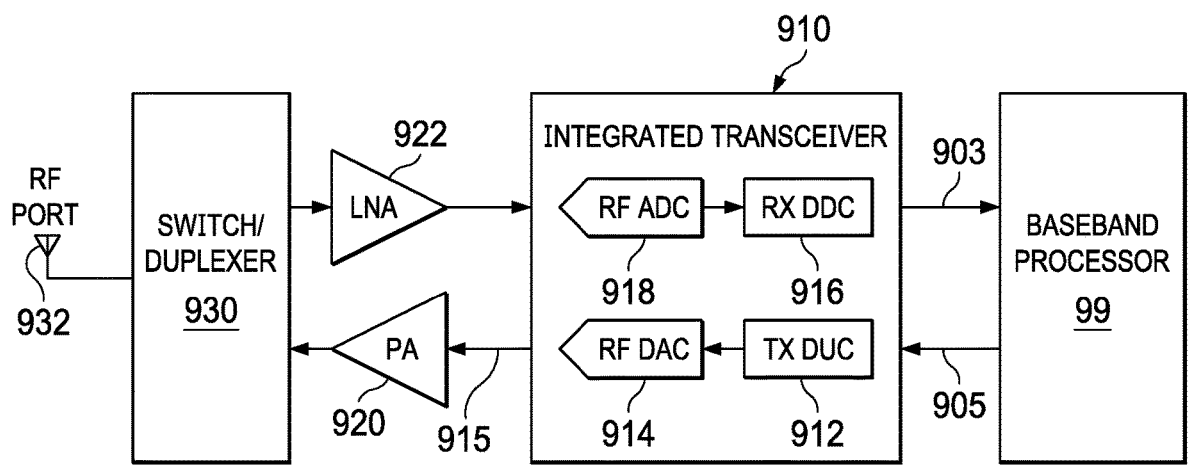
FIG. 9 shows an example of a system (e.g., a cellular base station) that includes the disclosed conjugate-mixer-combiner with a power amplifier that is shared by the frequency bands.

FIG. 9 shows an example of a system such as a cellular base station that includes the Conjugate-Mixer-Combiner described herein. The system includes a baseband processor 99, an integrated transceiver 910 (e.g., integrated on a single semiconductor die), a power amplifier (PA) 920, a low noise amplifier (LNA) 922, a switch/duplexer 930, and an RF port 932. The integrated transceiver 920 includes a receive signal path comprising an RF analog-to-digital converter (ADC) 918 coupled to a receive digital down converter (DDC) 916. The integrated transceiver 920 also includes a transmit signal path comprising an RF DAC 914 coupled to a transmit digital upconverter (TX DUC) 916. The DUC 916 includes Conjugate-Mixer-Combiner described herein. A received signal from the RF port 932 is provided to the LNA 922 via the switch/duplexer 930. The LNA 922 amplifies the signal and provides the amplified received signal to the RF ADC 918 where it is converted to a digital representation and downconverted by RX DDC 916 to a baseband frequency (signal 903) to be processed by baseband processor 99.

A baseband signal 905 to be transmitted from the baseband processor 99 is upconverted by the TX DUC 912, and the higher frequency signal from the TX DUC 912 is provided to the RF DAC 914 which converts the signal to an analog signal 915. PA 920 amplifies the analog signal 915 from the RF DAC 914 and the switch/duplexer 930 provides the amplified analog signal to the RF port 932 for transmission by an antenna.

The example system of FIG. 9 shares a power amplifier for both bands and thus is a wide-band power amplifier (i.e., the bandwidth of PA 920 is sufficiently large to be capable of amplifying the RF signals of both bands.

Figure 10:
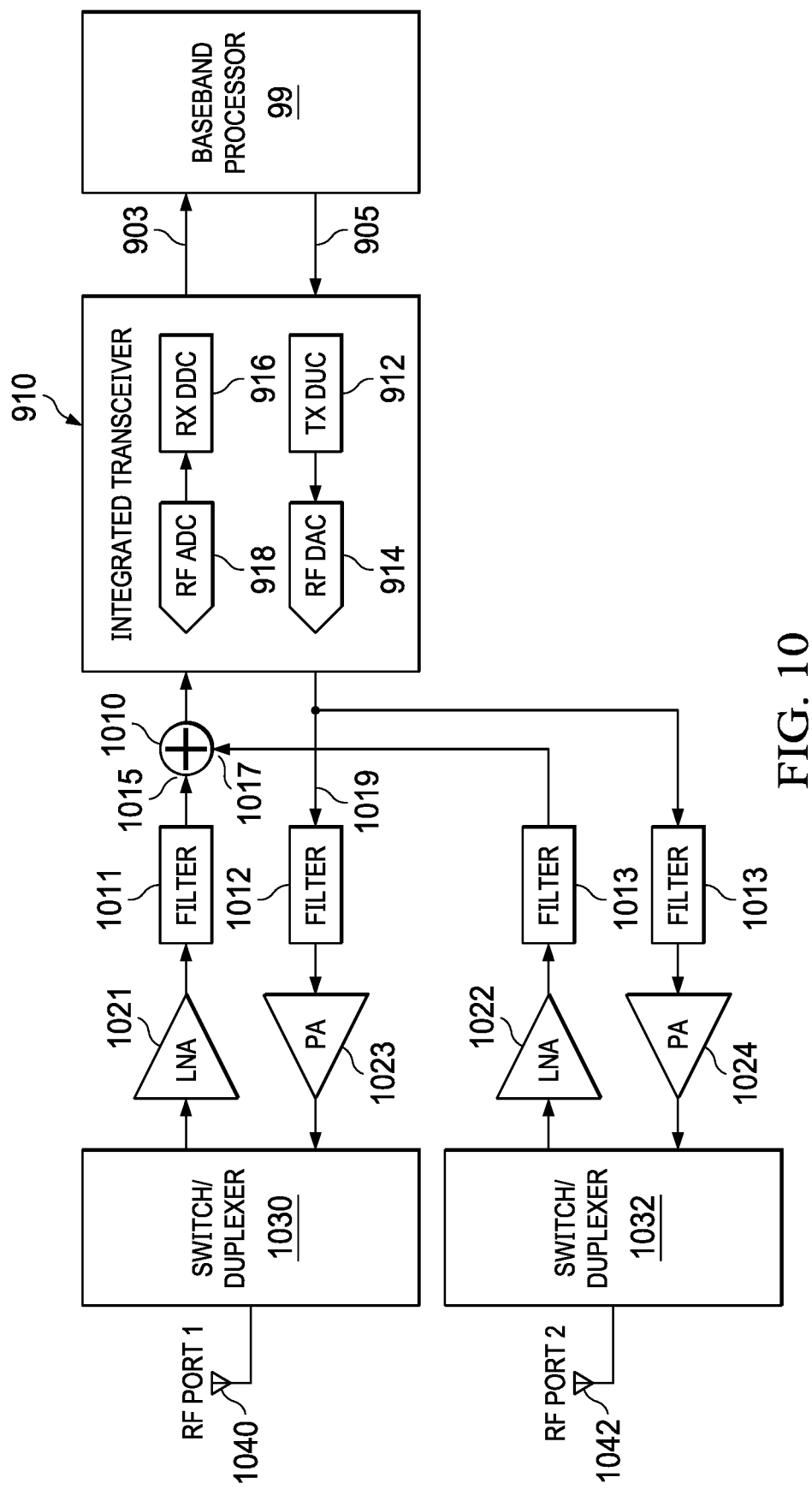
FIG. 10 shows another example of a system (e.g., a cellular base station) that includes the disclosed conjugate-mixer-combiner but with separate power amplifiers for each frequency band.

FIG. 10 shows an example of a system (e.g., a cellular base station) which has multiple power amplifiers—one power amplifier for each band. As such, each power amplifier can have a narrower bandwidth than would be the case of shared PA 920 of FIG. 9. In FIG. 10, the system includes the baseband processor 99 and integrated transceiver 910 as described above. Also included in the system of FIG. 10 is a summer 1010, filters 1011-1013, LNAs 1021 and 1022, PAs 1023 and 1024, a switch/duplexer 1030, a switch/duplexer 1032, and RF ports 1040 and 1042. RF port 1040 is coupled to switch/duplexer 1030 and switch/duplexer 1030 is coupled to an input pf LNA 1021 and to an output of PA 1023. The output of LNA 1021 is provided to an input of filter 1011 and the output of filter 1011 is provided to an input 1015 of summer 1010. Similarly, RF port 10420 is coupled to switch/duplexer 1032 and switch/duplexer 1032 is coupled to an input of LNA 1022 and to an output of PA 1024. The output of LNA 1022 is provided to an input of filter 1013 and the output of filter 1013 is provided to input 1017 of summer 1010. Summer 1010 is an analog signal summer and adds together the filtered output signals from filters 1011 and 1013. The output of summer 1010 is provided to the input of RF ADC 918. The summed signal is converted to a digital representation and down-converted by RX DDC 916 to produce the output signal 903 provided to the baseband processor 99.

The signal 905 from the baseband processor 99 to be transmitted is upconverted by TX DUC 912 and converted to a digital signal 1019 and provided to both inputs of filters 1012 and 1013. Each filter 1012 and 1013 has a bandwidth commensurate with one of the frequency bands. Each filter 1012 and 1013 is coupled to its respective PA 1023, 1024 as shown. The output of PA 1023 is coupled to RF port 1040 via switch/duplexer 1030. The output of PA 1023 is coupled to RF port 1042 via switch/duplexer 1032. As such, each band has its own power amplifier with a bandwidth commensurate with the frequency of the corresponding band.

Alternative examples to those illustrated are possible. Such alternatives may include fewer or more components. For example, in some implementations one of the illustrated DUCs is incorporated in a transceiver that includes a baseband processor and other components.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A system, comprising:
a conjugate-mixer-combiner comprising:
   a pre-combiner configured to generate:
      a first sum of a first in phase (I) value at a first frequency and a second I value at a second frequency;
      a first difference of the first I value at the first frequency and the second I value at the second frequency;
      a second sum of a first quadrature (Q) value at the first frequency and a second Q value at the second frequency; and
      a second difference of the first Q value at the first frequency and the second Q value at the second frequency; and
   shared multipliers coupled to the pre-combiner, the shared multipliers configured to shift the first sum to produce a first shifted sum, the second sum to produce a second shifted sum, the first difference to produce a first shifted difference, and the second difference to produce a second shifted difference.

2. The system of claim 1, wherein the conjugate-mixer-combiner further comprises:
a first adder configured to output a combined I output based on:
   the first shifted sum; and
   the second shifted difference; and
a second adder configured to output a combined Q output based on:
   the second shifted sum; and
   the first shifted difference.

3. The system of claim 2, further comprising:
an interpolator configured to generate a first higher sample rate version of the combined I output and a second higher sample rate version of the combined Q output; and
a real mixer configured to create a real radio frequency (RF) signal based on the first higher sample rate version of the combined I output and the second higher sample rate version of the combined Q output.

4. The system of claim 3, wherein the real mixer is configured to shift the real RF signal based on an average of the first frequency and the second frequency.

5. The system of claim 1, wherein the pre-combiner includes:
a first adder configured to generate the first sum;
a second adder configured to generate the first difference;
a third adder configured to generate the second sum; and
a fourth adder configured to generate the second difference.

6. The system of claim 1, further comprising a phase-coherent mixer frequency splitter configured to implement phase-coherent switching between different frequencies.

7. The system of claim 1, further comprising a digital step attenuator (DSA) phase correction splitter configured to apply phase correction for each band separately.

8. The system of claim 1, wherein the system is a cellular base station.

9. A digital up-converter (DUC), comprising:
a digital step attenuator (DSA) phase correction splitter configured to produce an average difference between a first DSA phase correction value and a second DSA phase correction value;
a sine (sin)/cosine (cos) generator coupled to the DSA phase correction splitter, the sin/cos generator configured to produce a sine signal and a cosine signal based on the difference between the first DSA phase correction value and the second DSA phase correction value; and
a conjugate-mixer-combiner coupled to the sin/cos generator, the conjugate-mixer-combiner comprising:
   a pre-combiner configured to generate a first combined value, a second combined value, a third combined value, and a fourth combined value; and shared multipliers coupled to the pre-combiner and to the sin/cos generator, the shared multipliers configured to:
  shift the first combined value based on the cosine signal to produce a first shifted combined value;
  shift the second combined value based on the sine signal to produce a second shifted combined value;
  shift the third combined value based on the cosine signal to produce a third shifted combined value; and
  shift the fourth combined value based on the sine signal to produce a fourth shifted combined value.

10. The DUC of claim 9, wherein the conjugate-mixer-combiner further comprises:
  a first adder configured to output a combined I output based on:
    the first shifted combined value; and
    the fourth shifted combined value; and
  a second adder configured to output a combined Q output based on:
    the second shifted combined value; and
    the third shifted combined value.

11. The DUC of claim 10, further comprising:
  an interpolator configured to generate a first higher sample rate version of the combined I output and a second higher sample rate version of the combined Q output; and
  a real mixer configured to create a real radio frequency (RF) signal based on the first higher sample rate version of the combined I output and the second higher sample rate version of the combined Q output.

12. The DUC of claim 11, wherein the DSA phase correction splitter is further configured to generate an average of the first DSA phase correction value and the second DSA phase correction value the real mixer is configured to shift the real RF signal based on an average of the a frequency and a second frequency and the average of the first DSA phase correction value and the second DSA phase correction value.

13. The DUC of claim 9, wherein the pre-combiner includes:
  a first adder configured to generate a sum of a first in phase (I) value and a second I value as the first combined value;
  a second adder configured to generate a sum of a negative of the first I value and the second I value as the second combined value;
  a third adder configured to generate a sum of a first quadrature (Q) value and a second Q value as the third combined value; and
  a fourth adder configured to generate a sum of the first Q value and a negative of the second Q value as the fourth combined value.

14. A circuit comprising:
  a first adder having a first positive adder input, a second positive adder input, and a first adder output;
  a second adder having a third positive adder input, a first negative adder input, and a second adder output, the third positive adder input coupled to the first positive adder input and the first negative adder input coupled to the second positive adder input;
  a third adder having a fourth positive adder input, a fifth positive adder input, and a third adder output;
  a fourth adder having a sixth positive adder input, a second negative adder input, and a fourth adder output, the sixth positive adder input coupled to the fourth positive adder input and the second negative adder input coupled to the fifth positive adder input;
  a first multiplier having a first multiplier input, a second multiplier input, and a first multiplier output, the first multiplier input coupled to the first adder output;
  a second multiplier having a third multiplier input, a fourth multiplier input, and a second multiplier output, the third multiplier input coupled to the third adder output and the fourth multiplier input coupled to the second multiplier input;
  a third multiplier having a fifth multiplier input, a sixth multiplier input, and a third multiplier output, the fifth multiplier input coupled to the second adder output; and
  a fourth multiplier having a seventh multiplier input, an eighth multiplier input, and a fourth multiplier output, the seventh multiplier input coupled to the fourth adder output and the eighth multiplier input coupled to the sixth multiplier input.

15. The circuit of claim 14, further comprising:
  a sine (sin)/cosine (cos) generator having a frequency input, a sin output, and a cos output, the sin output coupled to the sixth multiplier input and the eight multiplier input, and the cos output coupled to the second multiplier input and the fourth multiplier input; and
  a numerically controlled oscillator (NCO) coupled to the frequency input.

16. The circuit of claim 14, further comprising:
  a fifth adder having a seventh positive adder input, an eighth positive adder input, and a fifth adder output, the seventh positive adder input coupled to the first multiplier output and the eighth positive adder input coupled to the fourth multiplier output; and
  a sixth adder having a ninth positive adder input, a tenth positive adder input, and a sixth adder output, the ninth positive adder input coupled to the second multiplier output and the tenth positive adder input coupled to the third multiplier output.

17. The circuit of claim 16, further comprising:
  an NCO;
  a cos generator coupled to the NCO; and
  a real mixer coupled to the cos generator, to the fifth adder output, and to the sixth adder output.

18. The circuit of claim 17, further comprising:
  a digital step attenuator (DSA) phase correction splitter; and
  a seventh adder having an eleventh positive adder input, a twelfth positive adder input, and a seventh adder output, the eleventh positive adder input coupled to the NCO, the twelfth positive adder input coupled to the DSA phase correction splitter, and the seventh adder output coupled to the cos generator.

19. The circuit of claim 17, wherein the NCO is a four phase coherent NCO with independent phase offsets.

20. The circuit of claim 14, further comprising:
  a phase-coherent mixer frequency splitter;
  an NCO group coupled to the phase-coherent mixer frequency splitter;
  a digital step attenuator (DSA) phase correction splitter;
  an eighth adder having an thirteenth positive adder input, a fourteenth positive adder input, and an eighth adder output, the thirteenth positive adder input coupled to the DSA phase correction splitter and the fourteenth positive adder input coupled to the NCO group; and
  a sin/cos generator having a frequency input, a sin output, and a cos output, the frequency input coupled to the eighth adder output, the sin output coupled to the sixth multiplier input and the eight multiplier input, and the cos output coupled to the second multiplier input and the fourth multiplier input.

* * * * *